United States Patent [19]
Wahren

[11] 3,983,989
[45] Oct. 5, 1976

[54] CONVEYOR UNIT FOR COLLECTING, ACCUMULATING, VERTICALLY SHIFTING AND DISTRIBUTING OBJECTS OTHERWISE

[75] Inventor: Janne Ragnvald Wahren, Vadstena, Sweden

[73] Assignee: Ejvin Wahren AB, Sweden

[22] Filed: Oct. 19, 1973

[21] Appl. No.: 407,976

[30] Foreign Application Priority Data
Oct. 25, 1972    Sweden............................ 13801/72

[52] U.S. Cl............................. 198/778; 214/16.1 A
[51] Int. Cl.²......................................... B65G 15/02
[58] Field of Search............... 198/136, DIG. 19, 17; 214/16.1 A

[56] References Cited
UNITED STATES PATENTS

| | | | |
|---|---|---|---|
| 2,306,101 | 12/1942 | Van Zandt....................... | 193/35 A |
| 3,315,492 | 4/1967 | Dreksler......................... | 198/136 X |
| 3,360,097 | 12/1967 | Huffman et al...................... | 198/20 |
| 3,666,083 | 5/1972 | Smith................................. | 198/136 |

FOREIGN PATENTS OR APPLICATIONS
917,625    2/1963    United Kingdom................. 198/136

Primary Examiner—John J. Love
Assistant Examiner—Douglas D. Watts
Attorney, Agent, or Firm—Hill, Gross, Simpson, Van Santen, Steadman, Chiara & Simpson

[57] ABSTRACT

A conveyor chain in the form of a vertical endless guided helical loop operates as a separate unit for connection to incoming and outgoing continuously movable conveying tracks for collecting, accumulating and distributing objects normally being moved on such tracks in a manufacturing process. Selectively actuatable means are provided for connecting and disconnecting the tracks to and from the helical loop unit.

3 Claims, 7 Drawing Figures

CONVEYOR UNIT FOR COLLECTING, ACCUMULATING, VERTICALLY SHIFTING AND DISTRIBUTING OBJECTS OTHERWISE

BACKGROUND OF THE INVENTION

The present invention relates to conveyor chains and in particular to the use of conveyor chains for collecting, accumulating, vertically shifting and distributing objects which in a conveying system are conveyed on continuously movable conveyors.

In the production line manufacture of objects, in particular objects of lesser dimensions, it is in many cases suitable to convey the objects on continuously movable conveyor chains between the various working stations. As the working of the objects in the various stations normally cannot proceed at exactly the same rate in every station there is a need of intermediary storing of the treated objects. It is desirable that such intermediate storing can be combined into the manufacturing process as simply and smoothly as possible. The present invention solves this problem by using conveyor chain loops known per se which in a way characteristic of the invention are inserted into the continuously movable conveying track system of the manufacturing plant.

SUMMARY OF THE INVENTION

The invention includes conveyor chains for collecting, accumulating and distributing objects which in a manufacturing process are moved on continuously movable conveyor tracks, the conveyor chain is in the form of a vertical, endless, guided helical loop which as a separate unit is connected to incoming and outgoing continuously movable conveying tracks by means of selectively actuatable means for connecting and disconnecting the conveying tracks.

The conveyor chain can in this case be either continuously driven or intermittently driven in accordance with the actual storing requirements. The use of the conveyor chain can suitably be performed in such a way that the incoming conveying track is connected to the conveyor chain in the lower part thereof and the outgoing conveyor track is connected in the upper part of the chain for lifting the accumulated objects. In certain cases it is also suitable to use a helical loop having a rising and a falling section. The helical loop can be attached to the conveyor tracks in a number of ways and it is in certain cases suitable that a straight section of the helical loop extends along a conveyor track extending alongside the loop.

The invention is hereafter described by reference to practical embodiments.

ON THE DRAWINGS

FIG. 1 is a schematic plan view of a plant for production line manufacture of objects, which during the manufacturing process are shifted by means of conveyor tracks and using helical loops according to the invention.

FIG. 2 schematically illustrates an embodiment of such a helical track in elevation.

AS SHOWN ON THE DRAWINGS

Figure 1:
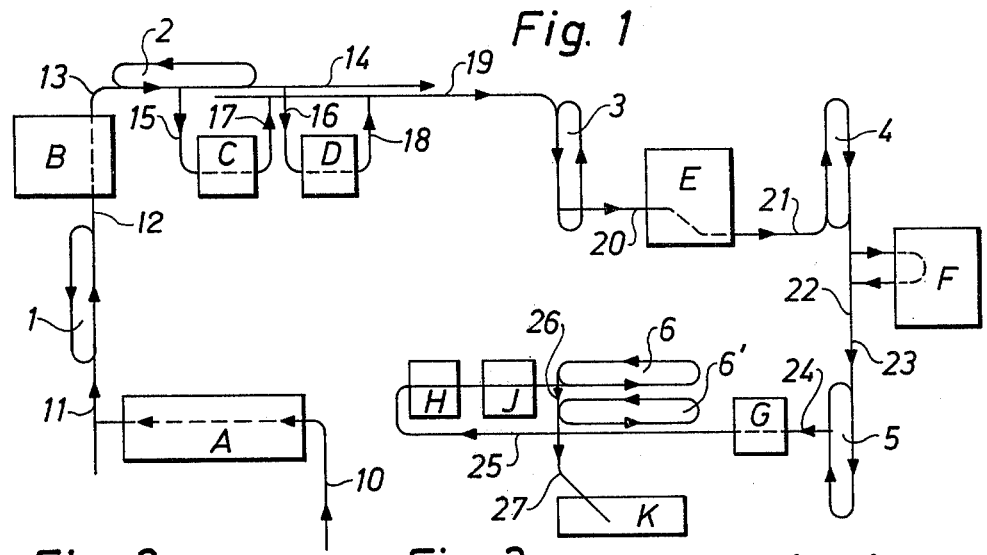

FIG. 1 schematically illustrates a plant for production-line manufacture of minor objects such as motor-car parts or the like. The parts are of such a size that they can be comfortably conveyed through the manufacturing process with the aid of light conveyor chains. The working of the parts is performed throughout in automatic machines. In this connection there is a need to collect the treated objects after each working station in a variable buffer supply. From this buffer supply the objects will again be discharged at a suitable rate and as the case may be also be distributed to a plurality of succeeding working stations operating in parallel. In many cases it is also desirable to lift the objects to a conveyor track disposed above the subsequent working machine for gravity transport from this track to the working station. The worked objects in this case will leave the machine at a lower level and normally there will be again a need for a vertical shifting ahead of the next working station.

In the example shown unworked blanks arrive on a conveyor track 10 to enter into a first working station A. After having been worked there the objects are transferred onto a relatively low transport track 11 which can be a collecting track receiving objects from other similar working stations corresponding to station A. From the track 11 the objects are supplied to the lower part of an accumulating loop 1. In this loop which is described in detail hereafter, the objects are collected and are conveyed by the loop in a helical path and in an upward direction. The loop is separately driven and its conveying speed can be adapted in accordance with actual needs. From the upper part of the loop the objects are discharged onto a conveyor track 12 which is situated on a higher level. Conventional means for connecting and disconnecting respectively the accumulator loop respectively to and from the conveyor tracks are provided. Via the track 12 the objects pass to the following working station B and are discharged therefrom via a conveyor track 13 on a lower level. Conveyor track 13 is adapted to be connected to the following accumulating loop 2 in the lower portion thereof. The objects are discharged from the accumulator loop 2 from the uppermost portion 14 extending straight from said loop. A pair of mutually parallel diverting tracks 15,16 extends from the straight portion 14 to the working stations C and D operating in mutually parallel relationship. A conveyor track 19 on a lower level conducts the objects to an accumulator loop 3 where they are intermediately stored in a similar way and, on a higher level, via a conveyor track 20 are introduced into a working station E from which the objects are introduced into an accumulator loop 4 via a conveyor track 21. From the outgoing upper extended portion 22 of the loop 4 the objects are diverted in parallel to working stations F (only one shown) and from these the objects are passed in a similar way as in accumulating loop 2 via a collecting track 23 to the lower turn of an accumulating loop 5. This loop acts as a collecting loop in the same way as the loop 3 and passes the objects via additional working stations G,H,J by means of a conveyor track 25 to a double loop 6,6'. Here the track 25 is connected to the lower part of the rising section 6 of the double loop from which the objects are passed via a transfer arrangement 26 to the falling section 6' of the loop to be discharged from the lower portion of this latter section to a final storing place K via a conveyor track 27.

The accumulating loops can be connected or disconnected as required respectively to and from adjacent conveyor tracks. This is performed by conventional means such as gates or doors. The speed of the accumulator loop chain may be varied in respect to the rate of production in attached working machines.

Figure 2:
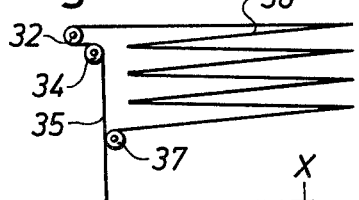
Figure 3:
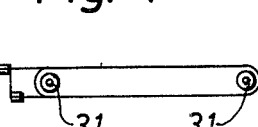
FIG. 3 is an endview.
Figure 4:
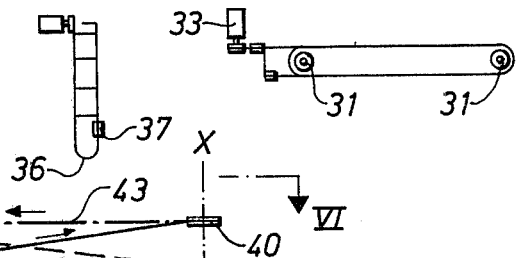
FIG. 4 is a plan view of the helical loop.

FIGS. 2, 3 and 4 illustrate a schematic example of an accumulating loop. This loop comprises an articulated conveyor chain adapted to be deflected in the conveying plane and in a plane perpendicular thereto and provided with shoulders or the like for engagement with a drive roller moving the band in its path of movement. Such a chain is shown in my copending application, Ser. No. 198,157 filed November 12, 1971, now U.S. Pat. No. 3,768,631. As appears from FIGS. 2 and 4 the articulated chain extends in a number of loop turns 30 disposed vertically one above the other. Each chain loop 30 preferably comprises two straight side portions mutually connected by curved end portions guided over a pair of turning pulleys 31,31. The outgoing upper section passes over a drive roller 32 engaging the chain and driven by a variable speed means 33. From the roller 32 the chain passes via another pulley 34 in a downward section 35 which after reversal at 36 is guided via another pulley 37 into the lowermost loop turn.

As stated in connection with FIG. 1 the outgoing upper portion of the chain, for example, may be extended from the loop to form an extension of the loop and to enable it to be connected to a plurality of connectable tracks. Also the lower loop turn may in a similar way be extended from the accumulator loop proper.

Figure 5:
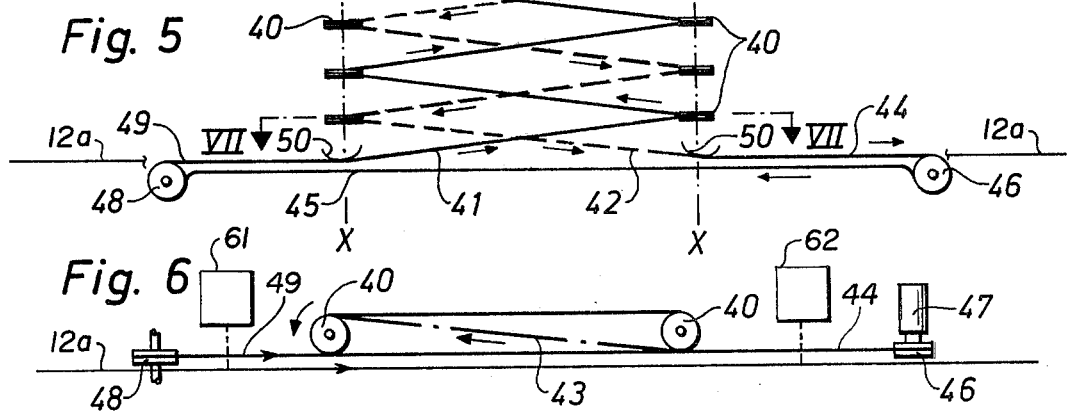
Fig. 5 illustrates a helical loop comprising a rising and a falling section according to the invention.
Figure 6:
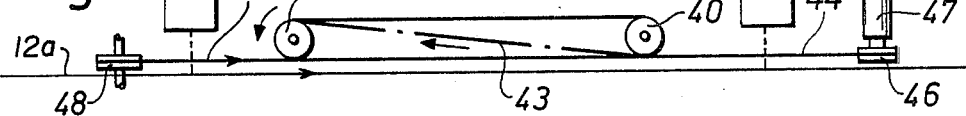
FIG. 6 shows this loop as seen from above.
Figure 7:
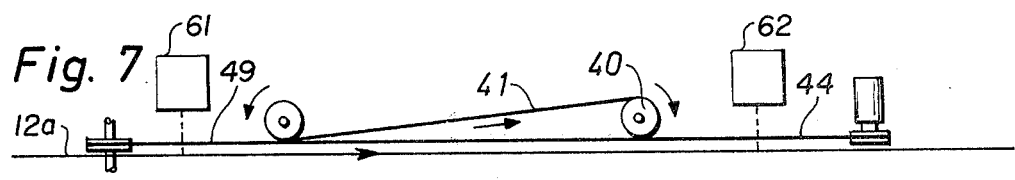
FIG. 7 is a section along line VII—VII in FIG. 5.

FIGS. 5, 6 and 7 illustrate another embodiment of an accumulating loop having a rising and a falling section. The loop comprises a number of guide pulleys 40 freely rotatable about two vertical axes X—X. In the example shown five such guide pulleys are provided one above the other on the respective vertical axis. The loop comprises a rising section generally designated as 41 and shown in full line in the drawing. Moreover, the loop comprises a falling section generally designated as 42 and illustrated in the drawing by a broken line. The moving direction of the articulated conveyor chain is indicated by arrows. As seen in the direction of movement the conveyor chain arrives in a horizontal section 49 and passes through a guide means 50. From there the chain is guided (FIG. 7) in an upwardly inclined direction to the lowermost guide pulley 40 on an axis X—X to the right in the drawing and passes around said pulley in a clockwise direction as seen in FIG. 7. The loop thus moves in a helical path clockwise upwardly about every second guide pulley 40 to the uppermost loop plane. In this plane the loop passes via section 43 (indicated by dot and dash line) from the uppermost right-hand guide pulley to the uppermost left-hand guide pulley as shown in FIG. 6. During this movement the conveyor band is passed about the latter pulley in a counter-clockwise direction as seen in FIG. 6, the loop subsequently moving in a helical path downwardly counter-clockwise via every second guide pulley 40 to the right-hand guide means 50 shown in FIG. 5 and subsequently via a horizontal section 44 to a drive pulley 46 forming part of a drive means 47. From here the conveyor chain passes horizontally in a section 45 to a reversing pulley 48 and from there again to the initial section 49. The attachment to conveyor tracks is suitably performed in sections 49 and 44. The accumulating loop according to FIG. 5 permits a highly condensed construction of an accumulating loop having a rising and a falling section, incoming and outgoing conveyor tracks being attached on the same level.

Many variations and modifications of the structure and connection of the accumulator loops are at hand. The disposition of the loops as single or double loops, their dimension in the horizontal plane and the number of superimposed loop turns can be varied within broad limits in order to satisfy actual needs regarding storing capacity, vertical shift and connecting requirements.

What I claim is:

1. Conveyor apparatus for objects, comprising in combination:
   a. conveyor track means adapted to continuously move the objects in a normal path in a manufacturing process;
   b. a series of guide pulleys disposed to rotate about two vertical axes;
   c. a conveyor chain formed as an endless helical loop guided on said pulleys, the loop being vertical and having a rising and a falling section;
   d. at least certain of the guide pulleys for the rising section being coaxial with corresponding pulleys of the falling section; and
   e. selectively actuatable means for connecting and disconnecting said chain to incoming and outgoing portions of the conveyor track means, by which the number of objects moving on said track means is altered.

2. Conveyor apparatus according to claim 1 in which said helical loop has a straight portion in which said connecting and disconnecting means are disposed, said straight portion extending alongside one of the conveyor tracks.

3. Conveyor apparatus for objects, comprising in combination:
   a. conveyor track means adapted to continuously move the objects in a normal path in one direction selectably to or past at least one working station in a manufacturing process;
   b. a separate conveyor unit including
      1. a first group of vertically spaced pulleys and a second group of vertically spaced pulleys offset laterally therefrom.
      2. an endless conveyor chain for supporting objects thereon and having a helical rising portion extending about alternate ones of said pulleys for driving them in one rotational direction, said chain extending from the upper end of said rising portion diagonally across the lateral space between said groups of pulleys to the upper end of a helical falling portion, the helical falling portion extending about the other of said pulleys for driving them in the opposite rotational direction, said chain extending from the lower end of said falling portion along a path that at least in part passes diagonally across said lateral space between said groups of pulleys to the lower end of said rising portion, whereby the helical portions are disposed in a single superimposed array in which objects on the rising and falling portions are spaced from each other,
      3. an inlet communicating with the lower end of said rising portion and adapted to selectably receive objects from said track means upstream of said working station, and an outlet communicating with the lower end of said falling portion and adapted to selectably return objects to said track means upstream of said working station; and c. selectably actuatable means normally operatively connecting and disconnecting said conveyor unit to and from said track means, but actuable for selectably laterally transferring objects between said unit and said track means, whereby the number of objects moving on said track means is altered.

\* \* \* \* \*